United States Patent [19]

Picard

[11] Patent Number: 4,792,937
[45] Date of Patent: Dec. 20, 1988

[54] PROCESS FOR THE MANAGEMENT OF FILES ON A NON-ERASABLE INFORMATION CARRIER

[76] Inventor: Michel Picard, 16 Cours du Buisson, 77420 Noisiel, France

[21] Appl. No.: 99,312

[22] Filed: Sep. 21, 1987

[30] Foreign Application Priority Data

Sep. 19, 1986 [FR] France ................. 86 13144

[51] Int. Cl.⁴ .......................................... G11B 7/13
[52] U.S. Cl. .................................... 369/59; 360/48
[58] Field of Search ........................... 369/59, 48

[56] References Cited

U.S. PATENT DOCUMENTS 4,611,314 12/1986 Ogara et al. .............. 369/59

OTHER PUBLICATIONS

Proceedings of International Conference on Data Engineering, (Apr. 1974).
ACM PODS, (1982).
IBM Technical Disclosure Bulletin, (Jun. 1981).
Angewandte Informatik, (Jan. 1973).

*Primary Examiner*—Vincent P. Canney
*Attorney, Agent, or Firm*—Nutter, McClennen & Fish

[57] ABSTRACT

A process for the management of files and digitized documents on a non-erasable information carrier consisting of storing objects on the header, file and directory types and a table for converting a logic address into a physical address. A partition into several segments is defines on the storage space, each segment serving to store a single type of objects. The structure chosen for the objects makes it possible to store the information in accordance with a tree-like architecture, wherein the directories form the nodes or knots. The partition is modifiable and is stored in the header. Each type of object comprises means of the chaining field type permitting an updating of its content.

4 Claims, 3 Drawing Sheets

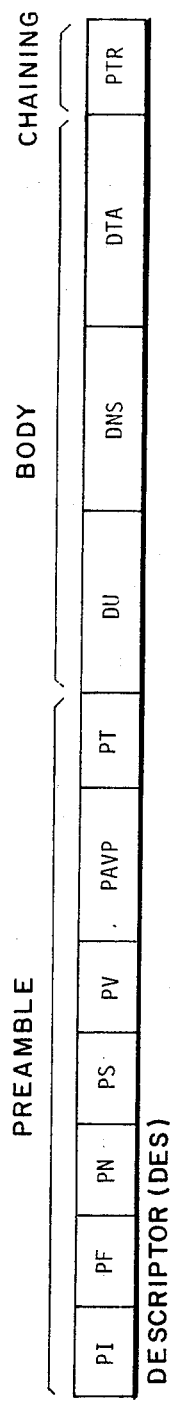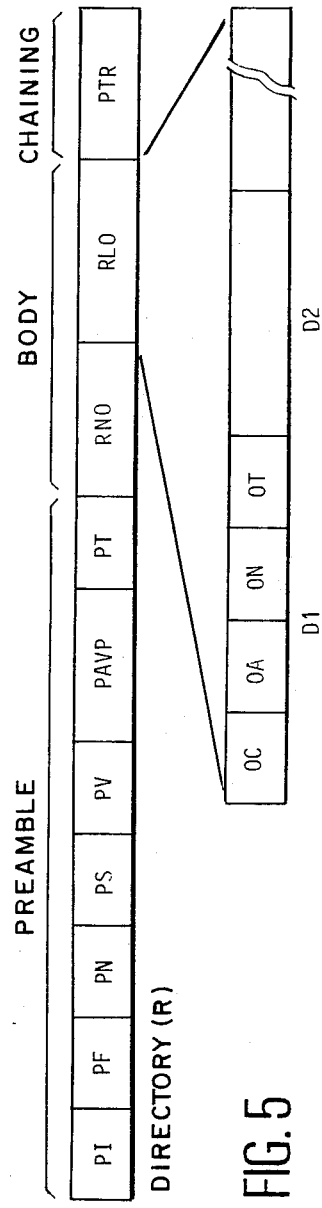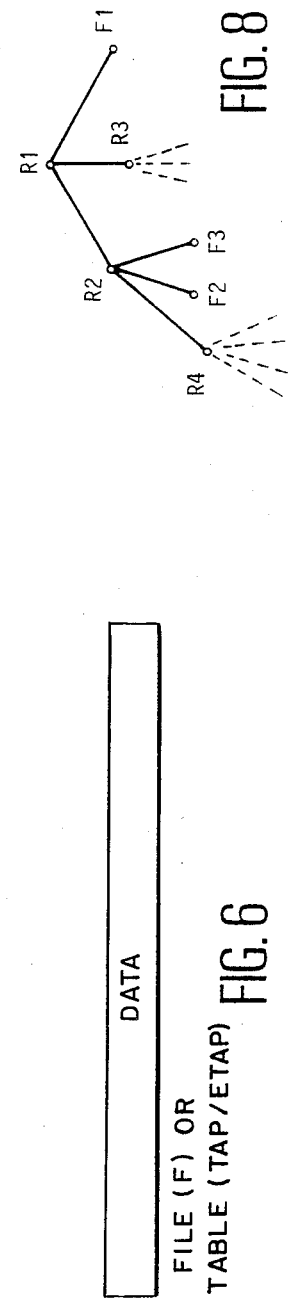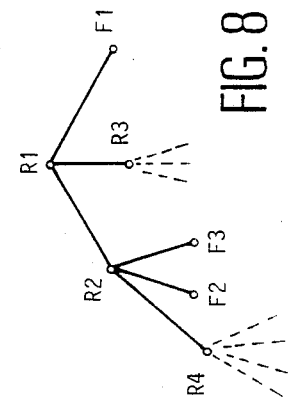

PROCESS FOR THE MANAGEMENT OF FILES ON A NON-ERASABLE INFORMATION CARRIER

BACKGROUND OF THE INVENTION

The present invention relates to a process for the management of files on a non-erasable information carrier. Such carriers are in particular used for the filing of voluminous information, as a result of the low cost thereof. They tend to be increasingly used in connection with the filing of digitized documents and files.

The digital optical disk is an example of non-erasable information carrier. On such a carrier, it is possible to write an information at any time, but it is not possible to modify a written information. Such a carrier is said to be of the "WORM" type.

A file management process makes it possible to record data on an information carrier in accordance with a certain structure permitting rapid access to such data. A file management process must consequently permit the recording, reading and modification of different types of objects, including directories, data representing the content of files and descriptors for describing the characteristics of recorded files and directories.

Conventionally, the objects are recorded in the form of a tree, whose terminal nodes or knots are the files and the other nodes of the directories.

Non-erasable information carriers, such as the digital optical disk, are information carriers having a very recent development and which, in an increasing number of applications, tend to replace the conventionally used erasable information carriers, such as magnetic disks or floppy disks.

Processes for the management of files on erasable supports, such as the UNIX (registered trademark), MSDOS (registered trademark) or other processes cannot be applied to non-erasable carriers, because these processes presuppose that it is possible to rewrite any information sector. Thus, specific methods have been proposed for managing files on a non-erasable information carrier.

Certain processes presuppose the association of an erasable carrier and a non-erasable carrier. The file content informations are recorded in the non-erasable carrier and the description informations on the erasable carrier. These processes are not satisfactory because they do not make it possible to ensure the transport of the non-erasable carrier alone and do not provide an adequate security level in the case of the loss of data written on the erasable carrier.

Processes for the management of files on non-erasable carriers are also known, in which all the informations are recorded on the non-erasable carrier.

A first process, called ISDOS, is described in the ISDOS Manual 1985 of Information Storage Inc. In this process, the content informations are sequentially recorded from one of the ends of the storage space (first sector of the innermost track in the case of a digital optical disk) and the description informations are sequentially recorded from the other end of the storage space (first sector of the outermost track in the case of a digital optical disk). Thus, this process permits separation of the description informations and the content informations, so that it is possible to carry out a rapid search in the description informations and therefore rapidly obtain access to a file.

However, this process has limitations compared with processes for the management of files on an erasable carrier, in that it only permits a single directory level. Thus, the ISDOS process does not respect the tree-like structure of the directories conventionally encountered in the processes for the management of files on an erasable carrier. Thus, two different files, but which carry the same name in two different directories on an erasable carrier, are transformed by the ISDOS process into two versions of the same file. Moreover, the existence of a single directory level requires a sequential passage through all the description informations for the search for a file or a file version, so that there are excessive search times or large memory volumes.

A process for the management of files on a non-erasable carrier is also known, which permits a hierarchic recording of the directories in accordance with a tree. This process, called CDFS, is described in "A File System for Write-Once and Compact Disks", 1985, by Simson L. Garfinkel, MIT Media Lab.

In this process, the storage space allocation mechanism is very simple, because it is sequential. However, the disadvantage occurs that the directories, files and descriptors are recorded continuously and interleaved in the same space. Thus, the search for a file, which requires a sequential passage through the directories and descriptors is disturbed by the presence of very voluminous content informations. Furthermore, this process does not take into account the problem of errors on the non-erasable carrier and presupposes that even a voluminous file can be recorded in one block on the non-erasable information carrier. This hypothesis is not satisfied in practice on existing non-erasable carriers, such as digital optical disks.

Moreover, the general directory, called DIRLIST, which is the starting point for any file search method, is a voluminous structure, which is totally rewritten at the end of each transaction. This can lead to a considerable consumption of the storage space of the non-erasable carrier.

Finally, the ISDOS and CDFS processes share the defect of only taking into account conventional computerized files. They are not designed to effectively manage different data structures, such as digitized document pages of the facsimile type.

The object of the present invention is to obviate these disadvantages. The invention also aims at proposing a process for the management of files on a non-erasable carrier having a flexibility of use which is substantially identical to that of the known file management processes for erasable carriers.

SUMMARY OF THE INVENTION

The invention relates to a process for the management of files on a non-erasable information carrier comprising storing objects, such as a header or heading of files, directories and file or directory descriptors, said files and directories containing data, whose access is defined by an object of the descriptor type associated with each of said files and directories, said files and said directories being stored in accordance with a tree-like architecture, whereof the files form the terminal nodes, said tree having a root directory, said process being remarkable in that the non-erasable carrier storage space is broken down into several segments, forming partition of said storage space, said partition having at least:

(a) a first segment for storing successive versions of a header, said versions being sequentially written into said first segment, each header version having at least one identification field for the carrier, a listing field for containing the list of segments forming the partition of the storage space and a data field for containing a first physical address, a second physical address, and a third physical address;

(b) a second segment for storing successive versions of a conversion table for converting a logic address of a descriptor into a physical address of a descriptor, said versions of said table being sequentially written into said second segment, each version of said table having a main table establishing a correspondence between a logic address and a physical address, for the physical addresses of the zones of the storage space containing an information at the time of the creation of said main table or for subsequently created objects and corresponding to a new logic address, and a supplementary table establishing a correspondence between a logic address and a physical address, for updatings of logic addresses contained in the main table, the addresses of said main and supplementary tables of the most recent version of the conversion table being written during the storage of a new header version respectively into the first physical address and into the second physical address of the data field of said header;

(c) a third segment for storing descriptors of files or directories, each descriptor having at least one preamble and a listing field, the preamble having at least one identification field for identifying the type (file or directory) described and a chaining field for connecting two successive versions of the same descriptor, and the listing field containing the list of physical addresses and the length of the zones of the storage space containing the file or directory, the physical address of the root directory being contained in the third physical address of the data field of the present header version;

(d) a fourth segment for storing directories, each directory having at least one preamble and an operations list, the preamble having at least one directory identifier and a chaining field to permit the addition of information to said directory and the operations list having the list of logic addresses of the file and directory descriptors contained in said directory and operations codes for indicating the state (existing or eliminated) of each of the said files and directories of said directory;

(e) a fifth segment for storing the content of the files.

The inventive process differs from known processes for the management of files on non-erasable carriers, on the one hand, through the structure of the objects dealt with by this process and, on the other hand, by the subdivision of the storage space into a plurality of segments, each of which is associated with a particular object type. The combination of these two elements permits a very flexible file management which, for a user, essentially offers the same functions as the processes for managing files on an erasable carrier.

For example, the inventive process makes it possible to improve security, particularly by the separation of the different objects, each of which is stored in a particular segment which is independently managed.

BRIEF DESCRIPTION OF THE DRAWINGS

The invention is described in greater detail hereinafter relative to non-limitative embodiments and the attached drawings, wherein show:

FIG. 4 The structure of a descriptor according to a preferred embodiment of the invention.

FIG. 5 The structure of a directory according to a preferred embodiment of the invention.

FIG. 6 The structure of a file according to a preferred embodiment of the invention.

FIG. 8 A tree having directories and files in accordance with a structure complying with the objects recorded in the storage space shown in FIG. 7.

DETAILED DESCRIPTION OF THE PREFERRED EMBODIMENTS

According to the invention, the storage space of the non-erasable information carrier is broken down into at least 5 segments, each segment serving to store only a single object type, all the segments forming a partition of the storage space.

Figure 1:
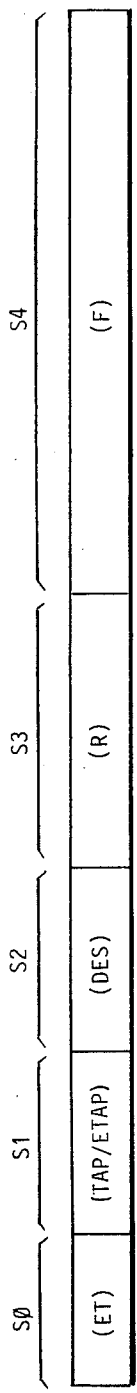
FIG. 1 A partition into 5 segments of the storage space of the non-erasable carrier.

In the embodiment of FIG. 1, the storage space comprises 5 segments S0, S1, S2, S3 and S4, which respectively have the following objects:

header recordings ET for storing fixed informations relative to the carrier, such as its name and date of creation and informations which are variable or can vary, such as the filling level of the storage space and the partition.

a table TAP for converting the logic address of an object given by the user into a corresponding physical address in the storage space, descriptors DES for storing the description informations of the directories and files, directories R and files F for recording the content of files.

Each segment defined on the storage space constitutes, from the logic standpoint, an element which is independent of the other segments. However, each segment can be physically constituted by several non-contiguous zones of the storage space if means are provided for permitting the storage of a logic link between the different non-contiguous zones of the same segment.

A description will now be given of a particular embodiment of each of the objects occurring in the segment shown in FIG. 1.

Figure 2:
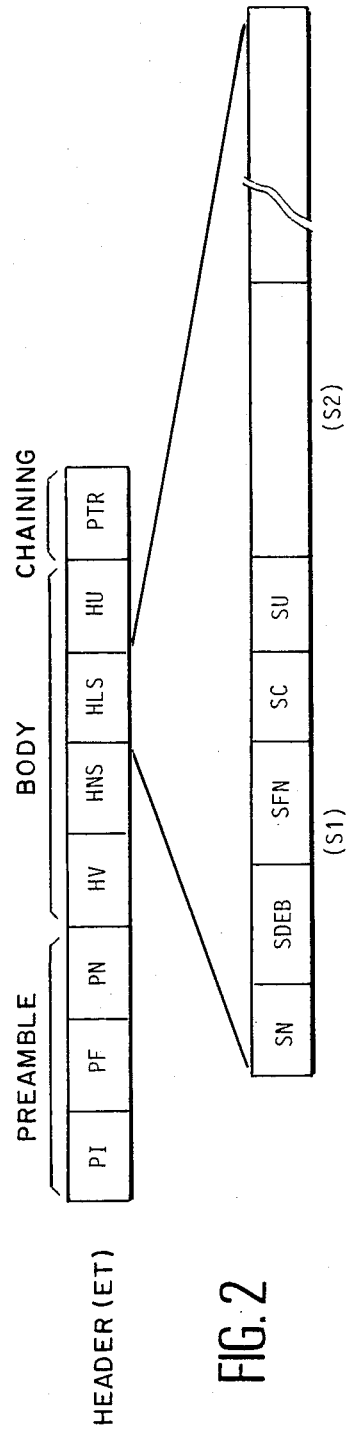
FIG. 2 The structure of a header according to a preferred embodiment of the invention.

FIG. 2 shows a preferred structure for the header information contained in segment S0. The header comprises a preamble, a body and a chaining field.

The preamble contains fixed information and is constituted by three data fields:

an identifier PI for indicating that the stored object is a header, a format index PF for indicating the exact structure according to which the following header informations are stored, an identifier PN for storing a name given to the non-erasable carrier.

The header body comprises the following data fields:

a version number HV, whose value is incremented for each new header version, an identifier HNS for indicating the number of segments constituting the partition of the storage space, a listing field HLS for indicating the list of segments defined on the storage space and a data field HU containing at least three physical addresses AP0, AP1, AP2 for locating the descriptors of the main and supplementary tables and the descriptor of the root directory.

The listing field HLS comprises all the informations defining the segments forming the partition of the storage space, where each segment is defined by a group of data, namely:

an identifier SN for storing the name of the segment, address fields SDEB and SFIN for storing the starting and finishing addresses of the segment, an address field SC for storing the current address for writing in the segment, i.e. the first free location in the segment at the time of storing the header and a complementary data field SU reserved for the user.

The third part of a header recording is the chaining field containing a pointer PTR making it possible to connect two successive header versions when these versions are not consecutively disposed in the storage space.

FIG. 2 shows a preferred header embodiment. However, it is obvious that other header structures are possible and in particular header structures obtained by eliminating certain data fields from the structure shown in FIG. 2.

In particular, it is possible to eliminate the chaining field PTR if successive header versions are consecutively written into the storage space. It is also possible to eliminate the data fields PN, HV, HNS, SN, SC and SU so as to only retain the essential identification functions of the header PI, format PF and description of the different segments HLS.

However, the date fields which are not necessary have some interest, particularly with regards to the aspect of security, because they make it easier to find an information.

Figure 3:
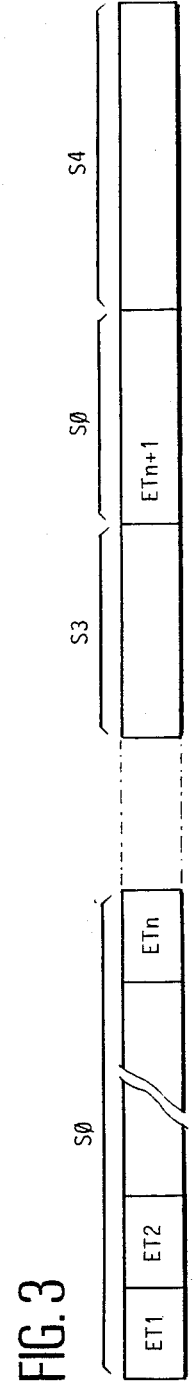
FIG. 3 The chaining between successive header versions, when said versions are located in the same segment and when they are located in different segments.

The use of a chaining field PTR is illustrated in FIG. 3, which shows successive header versions ET1, ET2 . . . ETn and ETn+1.

The first n header versions are consecutively written into segment S0. In this case, the chaining field PTR of each header is not used. However, the header ETn+1 is not written at the end of header ETn. This occurs when the header ETn is written in the final free location of segment S0. In this case, it is necessary to modify the partition of the storage space, so as to form an extension for segment S0. This also occurs when segment S0 is constituted by several non-contiguous zones and the header ETn occupies the last free location in one of the zones of segment S0.

In both cases the chaining field of the header ETn is used for storing the physical address corresponding to the location in which the successive version of the header ETn+1 will be stored. This address can be written into the chaining field of header ETn at the time of writing the latter, which makes it possible to reserve the location for the writing of the header ETn+1. It can also be subsequently written at the time of storing header ETn+1.

The Applicant has used the header structure of FIG. 2 for the management of a digital optical disk. The following exemplified values were chosen for the different header parameters:

head identifier PI:4 bytes format identifier PF:1 byte name of disk PN:14 bytes version number HV:2 bytes segment number HNS:2 bytes name of a segment SN:14 bytes user data SU:10 bytes SDEB, SFIN and SC addresses:4 bytes each data HU:100 bytes, whereof 12 are reserved for the first, second and third physical addresses pointer PTR:2 bytes for indicating the index of a segment.

In this embodiment, each segment is defined by five data items SN, SDEB, SFIN, SC and SU, representing a length of 36 bytes. The other elements PI, PF, PN, HN, HNS, HU and PTR have a fixed length of 123 bytes.

For a digital optical disk organized in sector-like manner and each having a length of 1024 bytes, a sector can contain a header defining a partition of the storage space into 25 segments. If the number of segments of the partition is larger, the header recording requires at least two sectors.

Hereinafter are summarized the different possible operations on the non-erasable carrier with respect to said header structure. For example, it is assumed that the non-erasable carrier is a digital optical disk organized into sectors.

INITIALIZATION OF A DIGITAL OPTICAL DISK

A segment S0 is reserved for the storage of successive header versions. An initial header version containing the name of the disk PN, at least the segment S0 and a version index HN=1 is written at the starting address of segment S0.

MOUNTING A DIGITAL OPTICAL DISK

Mounting consists of assuming a position at the starting address of segment S0 and then successively reading the header versions. The most recent version is that which is immediately followed by a blank sector. If the chaining field of a non-zero header is encountered, reading is continued on the segment designated by this field. The function realizing mounting receives at the input the name of the disk and checks that the field HN does contain this name.

CREATION OF A HEADER VERSION

A new header version can be created after the mounting operation. The value HV is incremented by 1. The header information is written at the current address SC of the header segment (segment S0) if there is no chaining. In the new header version, said current address is increased by the length of said new header version.

CREATION OF A SEGMENT

The creation of a segment consists of informing each of these fields (SN, SDEB, SFIN, SC and SU) and then adding 1 to the number of segments HNS and creating a new header version. The simultaneous creation of several segments gives rise to the creation of a single header version.

OPENING A SEGMENT

The opening of a segment takes place on the indication of its name (SN) or its rank in the list of segments (HLS). It presupposes that the mounting of the digital optical disk has taken place beforehand. It gives rise to the location of the current address between address SC and address SFIN.

LOCATION OF THE CURRENT ADDRESS

The current address of a segment corresponds to the first bland sector of said segment in the case where writing takes place by sequential allocation of the sectors from address SDEB to address SFIN. The location of the current address is sped up by taking as the starting point the address SC obtained during the opening of the partition. The value of SC is equal to the real current address if there has been no writing into the segment since the creation of the last header version and in the opposite case it is less.

WRITING INTO A SEGMENT

The writing into a segment which has previously been opened takes place at the current address and for an integral number N of sectors. The current address is then increased by N sectors. When the finishing address SFIN is reached, the segment is full and no further writing is possible there.

READING INTO A SEGMENT

Reading into a previously open segment takes place between addresses SDEB and SFIN. The addresses can be expressed in absolute terms (displacement with respect to the start of the disk) or relative terms (displacement relative to SDEB). An attempt at reading outside the segment returns an error code.

We will now return to FIG. 1. With reference to FIGS. 2 and 3 a preferred structure for a header recorded in segment S0 has been described. A preferred structure for a descriptor DES will now be described. This type of object is stored in segment S2.

A descriptor contains the informations necessary for access to the content of a file, as well as the descriptive characteristics of the file, such as the creation date, the access rights, etc. Descriptors are applicable to data filed, directories and logic address-physical address conversion tables.

A preferred descriptor structure is shown in FIG. 4. Each descriptor comprises a preamble for containing fixed data, a body for containing data liable to vary and a chaining field to permit, if necessary, an updating of the data contained in the descriptor body.

The preamble comprises the following data fields:

an identifier PI for indicating that it is a descriptor, a format index PF for determining the exact structure of the informations which follow, a name identifier PN for storing a sequence of characters forming the descriptor name, a sequence number PS, whereby the increasing informations security, the preamble is repeated after each modification, the sequence number being incremented on each occasion, a version number PV containing a numerical value identifying the present version of the descriptor, a pointer PAVP containing the address of the preceding version of the descriptor, which makes it possible to link by rearwards chaining successive versions of said descriptor, a field of type PT for distinguishing the different types of descriptors (directory, file or table).

The descriptor body comprises three data fields containing data which can vary over a period of time:

a user data field DU for containing informations such as a creation data, access right to a file and other similar characteristics, a field DNS containing a positive integer indicating the number of non-contiguous zones of the storage space in which are stored the data of the file, the directory or the table corresponding to said descriptor, a listing field DTA containing the list of physical addresses of the different zones of the storage space in which are contained the data and the length of each of these zones.

The data of a file, a directory or conversion table can obviously be consecutively stored in the storage space. The parameter DNS then has the value 1 and field DTA contains a single physical address and a single length indication.

However, it can be of interest, particularly in the case of a digital optical disk whose storage space is subdivided into sectors, to store the data in non-contiguous sectors either because certain sectors have errors and are inaccessible in writing, or to improve the security of the informations. Field DTA then contains the list of sectors which store the data.

Finally, the descriptor comprises a chaining field PTR, which is used to permit an updating of the informations contained in the descriptor body, particularly an addition, a replacement or an elimination of information contained in the descriptor body.

In French patent application, registration number 85 17670, filed on Nov. 29, 1985, to which reference can be made, the Applicant has described a process for the updating and reading of informations on a non-erasable carrier and which can be used for the updating of a descriptor.

As stated in connection with the header structure shown in FIG. 2, it is possible to eliminate certain data fields of a descriptor, particularly PN, PS, PV and PT without stopping the operation of the process according to the invention.

However, the elimination of optional data fields can have unfavorable consequences on the performances of the files management process, particularly with regards to the possibility of finding informations in the case of writing errors or defects in the storage space.

FIG. 5 illustrates a preferred structure for the objects of the directory type stored in segment S3 of FIG. 1. Each directory comprises a preamble, a directory body and a chaining field. In preferred manner, the preamble of a directory has a structure identical to the preamble of a descriptor. A distinction can be made between a directory and a descriptor by the value contained in identification field PI. The directory body comprises a first field RNO, which indicates a number of operations, and a second field RLO, which defines a list of operations.

Conventionally, the files are stored in accordance with a tree-like architecture, the root and intermediate nodes of the tree being constituted by directories and the leaves or terminal nodes of the tree are constituted by the files. Each directory-type node consequently comprises several grains or threads of the directory and/or file type.

The body of a directory makes it possible to store the directories and/or thread files of a directory. The number of threads is stored in field RNO an the list of threads in field RLO. With each thread is associated an operation consisting of 4 data fields:

an operation code OC for indicating the created or eliminated state of the thread.

a logic address field OA for indicating the logic address of the descriptor of the thread directory or file, a field ON for containing the name of said descriptor, a field of the OT type for storing the directory of file type of the descriptor.

The last two fields ON and OT are optional, but make it possible to increase the search rate in the memory.

Finally, FIG. 6 shows the structure of objects of the file type F contained in segment S4 or the table type contained in segment S1. This structure is particularly simple, because it is reduced to the content information of the file or table, without any insertion of other information, e.g. of the preamble type.

The data of a file or table can be stored consecutively in the storage space or can be stored in several non-contiguous zones. In both cases, the location of the data in the storage space is indicated by the informations contained in field DTA of the body of the descriptor associated with the file or the table.

Figure 7:
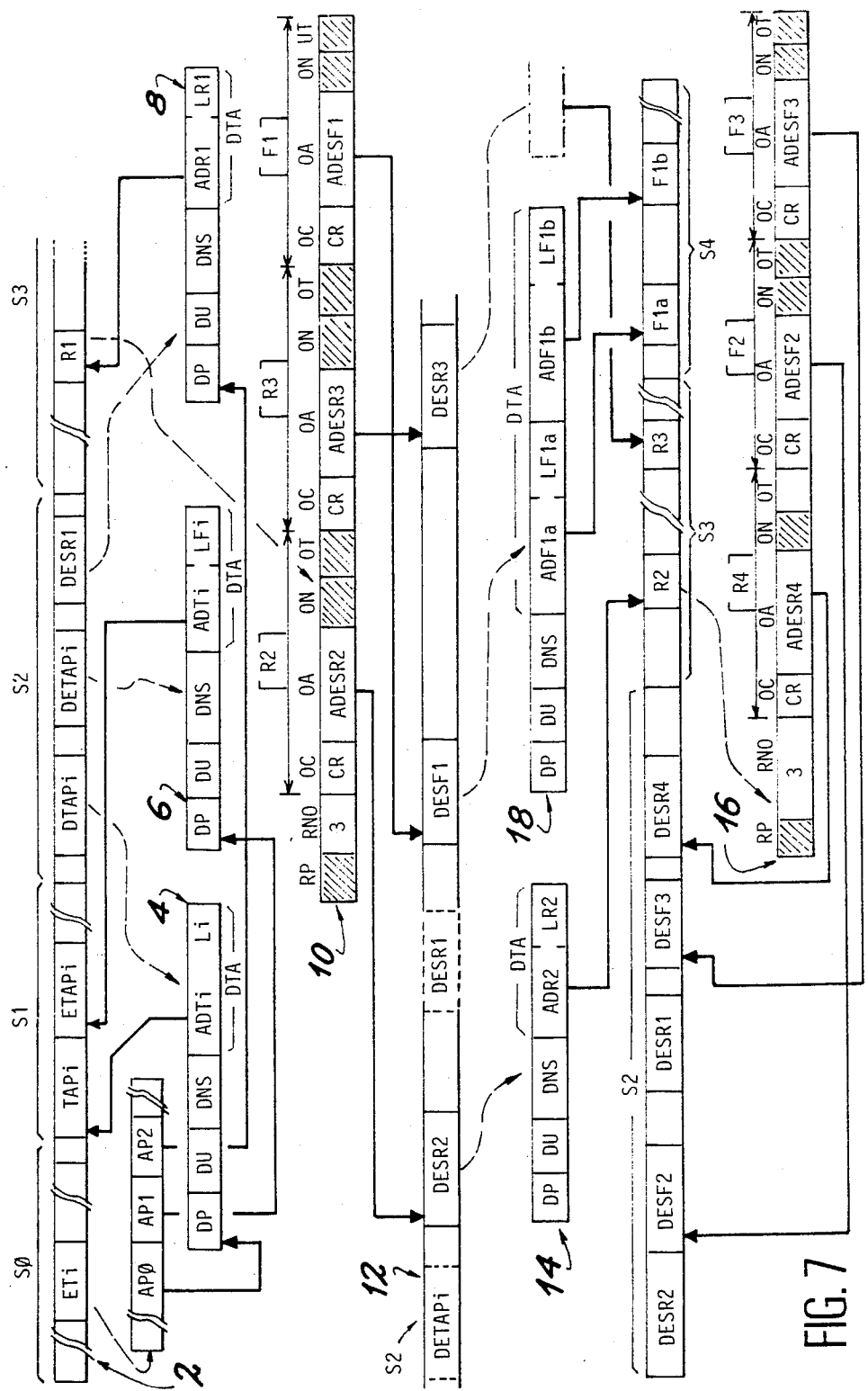
FIG. 7 The operation of the file management process according to the invention in connection with a non-erasable information carrier, whose storage space is segmented according to FIG. 1 and whereof the recorded objects have a structure according to FIGS. 2 to 6.

With reference to FIGS. 2 to 6 preferred structures for each of the objects manipulated by the inventive file control or management process has been described. With reference to FIG. 7 the logic relationships existing between the different objects and making it possible to manage the files with be defined.

Conventionally, each file is linked with a directory and the directories are interleaved hierarchically so as to define a tree. FIG. 8 shows a tree corresponding to the logic relationships of FIG. 7.

In FIG. 7, reference 2 indicates part of the storage space incorporating segments S0 containing the successive header versions, segment S1 containing the successive conversion table versions, segment S2 containing the descriptors and segment S3 containing the directories.

The first information permitting access to the file contained in the non-erasable carrier is the group of three physical addresses AP0, AP1 and AP2, which are recorded in the data field HU of the present version of the header ETi. These physical addresses respectively designate the descriptor of the main conversion table (TAP), the descriptor of the supplementary conversion table (ETAP) and the descriptor of the directory R1 constituting the root of the tree (FIG. 8).

Thus, the physical address AP0 designates the descriptor DTAPi of segment S2 associated with the main conversion table. Reference 4 designates the structure of said descriptor, as described relative to FIG. 4. Field DTA contains the addresses and lengths of each of the zones of segments S1 containing the data of the main table TAPi.

In the same way, physical address AP1 is equal to the starting address of the descriptor DETAPi of segment S2 associated with the supplementary table. Reference 6 shows the detailed structure of this descriptor. The field DTA of said descriptor contains the list of addresses of the zones of segment S1, as well as their lengths, which contain the data of the supplementary table ETAPi.

These two tables are particular files making it possible to establish a correspondence between a logic address, received from the outside by the file management process and a physical address designating the real location of the object sought in the storage space of the non-erasable carrier.

The first file is a main table TAP giving the list of physical addresses corresponding to the logic address, whose value is equal to the rank in the table of stored objects.

Logic addresses AL0, AL1 and AL2 can be respectively reserved for designating the descriptor of the main table TAP, the descriptor of the supplementary table ETAP and the descriptor of the root directory R1. These data are redundant with the physical addresses AP0, AP1 and AP2. They increase security. The newly crated logic addresses can be sequentially added to said table via the chaining field PTR of its descriptor.

The second file is a supplementary table ETAP permitting the updating of the preceding table. It is constituted by pairs of logic—physical addresses which give, for a given logic address, the physical address of the final version. This table is not arranged according to the rising order of the logic addresses. Therefore it can be preferable to load it into an external memory for effectively accessing the final version of a given logic address. This supplementary table can be updated by addition like the main table.

The conversion of a logic address into a physical address commences by the seeking of the final version of the logic address in the supplementary table ETAP. If the logic address is found, the corresponding physical address is selected. In the opposite case, there is direct access to the main table TAP, at the rank given by the logic address and the obtaining of the corresponding physical address.

Periodically the main TAP and supplementary ETAP tables can be merged to form a new version of the updated main table TAP and a new initially empty supplementary table ETAP.

On returning now to the physical address AP2 contained in the field HU of the present header version, said address designates the location in segment S2 of the descriptor of the directory R1 constituting the root of the tree. Numerical reference 8 illustrates in detail the structure of said descriptor. Field DTA of said descriptor contains informations concerning the address and length of the zones of segments S3 containing said directory R1. The content of said directory is shown in detail under reference 10. It is possible to see the different data fields of the directory and the value of certain of them is indicated.

As shown in FIG. 8, directory R1 contains directories R2, R3 and file F1. The value of field RN0 of directory R1 is consequently equal to 3. In the operating field OC associated with the descriptor of each of the directories R2, R3 and file F1 has been entered the value CR in order to indicate that said directory and said field are created (the other possible value for the operating filed OC is the value SP indicating an elimination).

Finally, the address fields OA respectively contain the values ADESR2, ADESR3 and ADESF1 indicating the logic addresses of descriptors DESR2, DESR3 and DESF1 in segment S2. For reasons of clarity, said segment is shown again in FIG. 7 and it carries the reference 12.

Thus, one has passed from the directory R1 constituting the tree root to directories R2, R3 and file F1, which are level with the immediately lower nodes or knots, by translating the logic addresses ADESR2, ADESR3 and ADESF1 into physical addresses APR2, APR3 and APF1, in accordance with the conversion process using tables TAP and ETAP. The process can be repeated to successively pass through each of the levels of the tree and thus reach any random file stored in the non-erasable carrier.

For example, to reach files F2 and F3, it is necessary to access the content of directory R2 via its descriptor DESR2, which is represented in detail under reference 14. Its field DTA contains the informations necessary for accessing the content of directory R2 contained in segment S3. Directory R2 is illustrated in detail under reference 16. It comprises informations relative to the existence or elimination of directory R4 and files F2, F3 and addresses of descriptors of said directory and said files in segment S2.

With regards to file F1, its descriptor DESF1, whose content is detailed under reference 18, permits access to the actual content of the file via informations contained in field DTA. For example, the case is illustrated where said file was stored in two separate zones in segment S4.

Finally, the content of directory R3 is accessible via its descriptor DESR3, in the same way as directory R2 by its own descriptor.

FIG. 7 illustrates the structure of objects manipulated by the inventive file management process and the logic relationships created between the different types of objects. The above description shows that the inventive process for the management of files on anon-erasable carrier makes it possible to manage said files in accordance with a tree-like architecture and permits an updating of said files in the same way as a process for the management of files on an erasable carrier, such as a magnetic carrier.

To illustrate the possibilities offered by the file management process according to the invention, a description will now be given of the main functions available for managing files, associated with the structure of the objects manipulated by the process. For example, it is assumed that the non-erasable carrier is a digital optical disk organized into sectors.

ALLOCATION OF PHYSICAL ADDRESSES

For each segment, the header has a counter (address field SC), which stores the value of the next physical address for writing it into said segment. When an object with a size of N sectors is written at said address, the counter is increased N times the size of a sector. The means making it possible to load these counters and store the content thereof in a permanent manner are described in French patent application No. 85 17670.

CREATION OF A LOGIC ADDRESS

The creation of a logic address corresponding to a new directory or to a new descriptor takes place by increasing by 1 the final logic address and by adding in the main table TAP the corresponding physical address. As the logic address creation takes place in a strictly continuous manner, there is a simple addition to the main table TAP, without modifying the supplementary table ETAP.

ADDITION OF INFORMATION TO A MODIFIABLE OBJECT

The addition of information to an object previously recorded on the digital optical disk utilizes a post-field. It is possible to add a random number of informations of random length, although this has repurcussions on the access times.

Certain digital optical disks have a real post-field, which is a small zone of data associated with each of the sectors and which can be written independently of the associated sector and is used for establishing chanining effects. For digital optical disks not having a real post-field, the latter can be simulated. Such a simulation process is described in French patent application No. 85 17670.

In the case of a real post-field, the post-field of the final sector allocated to the object initially contains a zero value. During an addition of information to the object a sequence of physical addresses is allocated to the added information. THe first of these physical addresses is then entered in the post-field of the final sector of the initial information. The process recursively applies to the addition informations chained with one another.

In the case of a simulated post-field, a chaining field is sampled over the useful length of each sector in the case where said sector is of the modifiable type. In this case, the sequence of addition operations is identical to that described in the case of the real post-field.

CREATION OF THE ROOT AND TABLES

The initialization of a digital optical disk managed in accordance with the inventive process requires an operation of initially creating the directory forming the tree root and locations of tables TAP and ETAP. This operation accompanies that of creating the header.

In said operation, it is possible to define segments of a random size. A possible distribution of the informations is as follows:
  a segment S0 for header versions,
  a modifiable segment S1 for tables TAP and ETAP,
  a non-modifiable segment S2 for the descriptors,
  a modifiable segment S3 for the directories,
  a non-modifiable segment S4 for the file contents.

In the table and root creation operation, the three logic addresses AL0, AL1 and AL2 are each allocated a physical address, in which will be respectively entered the descriptors of type PI="file descriptor" for tables TAP and ETAP and the descriptor of type PI="directory descriptor" for the root. The thus created physical addresses are recorded in table TAP, which is then written on the digital optical disk. Table ETAP and the directory forming the root are empty.

The three physical addresses are then integrated into the user data HU of the header information and this new header version is recorded in segment S0.

READING THE TABLES AND THE ROOT

During the first reading of the digital optical disk, there is access to the most recent header information version by passing through the successive versions until reaching the header version having no successor. The user data of said information contain the physical addresses of tables TAP and ETAP and of the root.

CREATION OF A DIRECTORY

The creation of an empty directory is constituted by the two following operations:
  allocation of a physical address AP in segment S3 of directories, said zone containing the data of the directory, namely a preamble, followed by a list which initially contains no operations;
  creation of a directory descriptor with DNS having the value 1 and DTA containing AP.

The creation of a series of file descriptors, followed by the creation of their directory makes it possible to directly create a non-empty directory. In this case, list RL0 is informed with the succession of operations corresponding to said descriptor creations.

UPDATING A DIRECTORY BY ADDITION

The updating of a directory can correspond to the creation of a new descriptor and the elimination of an existing descriptor. For each operation, the corresponding fields will be informed (OC=operation code, OA=logic address returned by the operation of creating the descriptor or logic address of the descriptor to be eliminated). The thus formed list of operations RL0 is concatenated with a preamble RP. The latter contains the informations of the preceding preamble of the directory, except the sequence field PS, which is incremented by 1. The complete information block is then added to the existing directory, as described under "addition of information to a modifiable object".

UPDATING A DIRECTORY BY VERSION CREATION

The previously described updating creates chains of modifications, which can slow down the access times. It may be necessary to constitute a new directory version grouping all these informations into a single block. This operation is brought about simply by reading the directory with all its additions and creating a new directory at a new physical address AP. Version PV of preamble PR is incremented by 1 and field PAVP is informed with the physical address of the preceding version of the directory. A new version of the directory descriptor is created, which contains the new physical address AP in DTA. The preceding version of the descriptor is chained to the new version of the descriptor as indicated hereinafter under "creation of a descriptor version".

READING A DIRECTORY

A directory is read as from its descriptor. The physical address of the start of the directory is the first address contained in DTA. The first list of operations RL0 is read into the memory. If this first block formed the object of an addition (post-field of the final sector informed), there is a reading of the following list of operations and so on. In the stored list of operations, which contains the operations and address codes OC, OA respectively, there is an elimination of addresses, in which OC="elimination".

CREATION OF A DESCRIPTOR

The creation of a descriptor necessarily follows the writing of its content (the table of addresses DTA must have been formed) and this takes place as follows:

creation of a logic address AL with allocation of its physical address AP in segment S2 of descriptors, formation of the descriptor, with its preamble DP, the possible user data field DU an the list of addresses of the content (DNS and DTA), writing said descriptor at physical address AP.

CREATION OF A DESCRIPTOR VERSION

A descriptor is not modifiable and can only evolve by version creation. The descriptor must have been previously formed, either with the writing of a new file or with the updating of an existing file.

The preamble of the new descriptor is identical to that of the preceding descriptor, except that the version PV is incremented by 1 and address PAVP is informed with the physical address of the preceding descriptor. The new version is then created in the same way as an initial descriptor.

READING A DESCRIPTOR

Reading a descriptor takes place on the basis of its logic address. The two tables TAP and ETAP are used in order to deduce the physical address therefrom and as described with reference to FIG. 7. The simple reading of the final version of the descriptor located at said physical address gives all these informations, including the physical addresses of the content. To access the previous versions, the given chaining is followed by PAVP.

CREATION OF THE FILE

A file content is created in the following way:

creation of a logic address AL and allocation of its physical address AP in the segment S4 of file contents, initialization of the number of zones at 1 and of the first address of DTA with AP, writing the content of the file from said physical address for an integral number N of sectors. When there is no writing error, the physical address progresses by one sector. If there is a writing error, the erroneous sector is ignored and rewritten into the following sector. The number of zones DNS is incremented by 1 and field DTA receives the address of the first sector, where writing has been successfully performed, with fields DNS and DTA formed, said operation is necessarily followed by the creation of the associated descriptor.

UPDATING A FILE

Updating of the content of a file only takes place by addition, with the creation of a new descriptor version. The procedure is as follows:

recording the file updating content in accordance with the preceding method, with allocation of a new physical address in segment S4 (but no logic address), said operation creating one or more zones, whose addresses are stored in a list of addresses NDTA of NDNS elements, reading the descriptor, addition to the number of segments DNS of the new number of segments NDNS which have just been created and to the list DTA of the new list NDTA, creation of a new descriptor version.

READING A FILE

Reading a file content takes place from its descriptor. The DNS zones, whose addresses and lengths are given in the descriptor (list DTA) are read and added to one another to form the complete content.

SEEKING A FILE OR DIRECTORY BY ABSOLUTE NAME

Seeking a file or directory takes place on the basis of its absolute name, i.e. the succession of name of directories from the root to the name of the file, while passing through all the subdirectories.

The succession of operations is reading the root directory and seeking the logic address of the descriptor, whose name corresponds to the first name of the chain. Thus, the process applies to all successive relative names forming the absolute name. All the intermediate names must correspond to directory descriptors (field type OT="directory descriptor").

The process permits different types of operations:

positioning on a directory by its absolute or relative name, seeking a file by relative name (in the directory on which one is positioned), positioning on the directory containing the current directory.

The inventive file management process has very general uses. It can be used for different applications, including the realization of a conventional file management process, like that of UNIX (registered trademark), or the realization of a process particularly adapted to the management of digitized documents.

The inventive file management process described relative to FIGS. 1 to 8 and for which all the possible functions have been defined is directly applicable to the realization of a conventional field management process on a digital optical disk. For example, a compatibility with the UNIX file management process can be ensured by defining the following parameters:

a sector size LC=1024 bytes, a physical address AP represented on 4 bytes (i.e. 4294967296 possible values), a logic address AL also represented on 4 bytes, a simulated post-field occupying a physical address, a 25 byte preamble, in which:

PI=3 bytes ("REP" for directory, "DF" for file descriptor, "DR" for directory descriptor), PF=1 byte (initialized at "1")

PN=14 bytes,

PS=1 byte (256 possible values),

PV=2 bytes (65536 possible values),

PAVP=4 byte physical address, a 20 byte operation in which:

OC=1 byte ("CR" for creation, "SP" for elimination),

OA=4 byte logic address,

ON=14 bytes,

OT=1 byte ("R" for directory, "F" for file), a directory in which:

RNO=2 bytes (65536 values), so that in a sector of lengths

LS=1024, it is possible to enter 49 operations, but this is not a limit and a directory can be written on more than one sector, a descriptor in which:

DU=64 bytes making it possible to record the complete characteristic of a "i-node" in the sense of the UNIX file management process, DNS=2 bytes, DTA=4 bytes for the physical address and 4 bytes for the length and in a sector of length 1024, it is thus possible to enter 116 zones, but a descriptor can be written on more than one sector.

The process can be adapted for the management of digitized documents (digitized plans, facsimile type pages, etc.). In this system, the documents are constituted by pages and can be classified in dossiers. The pages are identical to the files of the process, whilst the documents and dossiers are both identical to the directories.

The process realizes such a system by defining parameters differing slightly from those referred to hereinbefore, namely:

in the preamble:

PI can assume the values:

"DDS" for dossier descriptor,

"DDC" for document descriptor,

"RDS" for dossier-type directory,

"RDC" for document-type directory,

"DP" for page descriptor in operation:

On has the page number if PI="RDC",

OT can assume the values "D" for dossier, "F" for document or

"P" for page, in the descriptor, file DU differs as a function of type PI:

DU contains access rights, in which PI="DDS" or "DDC",

DU contains a description of the page characteristics in the case where PI="DP" and said characteristics can e.g. be:

page size, acquisition resolution, coding type, orientation.

In this application, the partition defined on the storage space can comprise 6 segments:

a segment S0 for the header versions, a modifiable segment S1 for tables TAP and ETAP, a non-modifiable segment S3 for the descriptors of dossiers and documents, a non-modifiable segment S3 for the page descriptors, a modifiable segment S4 for directories of the dossier and document type, a non-modifiable segment S5 for the page contents.

This segmentation in particular makes it possible to limit the size of the segments S2 and S4, so that they can be loaded into the memory to increase the search speed.

The term modifiable segment is understood to mean that any object of the segment can be modified by information addition. This presupposes that the non-erasable carrier has real post-fields, or that said objects are provided with a simulated post-field, like the chaining field PTR of the objects shown in FIGS. 2, 4 and 5.

What is claimed is:

1. A process for the management of files on a non-erasable information carrier, said process comprising storing objects of the header, file and directory types, said files and directories containing data, whose access is defined by a descriptor-type object associated with each of said files and directories, said files and directories being stored in accordance with a tree-like architecture, whereof the files form the terminal nodes or knots, said tree incorporating a root directory, wherein the storage space of the non-erasable carrier is subdivided into several segments forming a partition of said storage space, said partition also having:

a first segment for storing successive versions of a header, said versions being sequentially written into said first segment, each header version having at least one identification field for the carrier, a listing field for containing the list of segments forming the partition of the storage space and a data field for containing a first physical address, a second physical address, and a third physical address, a second segment for storing successive versions of a conversion table for converting a logic address of a descriptor into a physical address of a descriptor, said versions of said table being sequentially written into said second segment, each version of said table having a main table establishing a correspondence between a logic address and a physical address, for the physical addresses of the zones of the storage space containing an information at the time of the creation of said main table or for subsequently created objects and corresponding to a new logic address, and a supplementary table establishing a correspondence between a logic address and a physical address, for updating of logic addresses contained in the main table, the addresses of said main and supplementary tables of the most recent version of the conversion table being written during the storage of a new header version respectively into the first physical address and into the second physical address of the data field of said header, a third segment for storing descriptors of files or directories, each descriptor having at least one preamble and a listing field, the preamble having at least one identification field for identifying the type (field or directory) described and a chaining field for connecting two successive versions of the same descriptor, and the listing file containing the list of physical addresses and the length of the zones of the storage space containing the file or directory, the physical address of the root directory being contained in the third physical address of the data field of the present header version, a fourth segment for storing directories, each directory having at least one preamble and an operations list, the preamble having at least one directory identifier and a chaining field to permit the addition of information to said directory and the operations list having the list of logic addresses of the file and directory descriptors contained in said directory and operations codes for indicating the state (existing or eliminated) of each of the said files and directories of said directory, a fifth segment for storing the content of the files.

2. A process according to claim 1, wherein for entering a new header version as a replacement for the present header version when the segment containing successive header versions is full, a new segment is created, said new header version is entered in said new segment and chaining is brought about between said new header version and said present header version.

3. A process according to claim 1, wherein the objects of the directory type have a chaining field permitting an updating of the content of said objects.

4. A process according to claim 1 for the management of digitized documents, wherein the objects of the directory type incorporate dossiers and documents, the directories of the document type being linked with directories of the dossier type and objects of the file type have pages linked with directories of the document type, the third segment only receiving directory descriptors and the storage space having a sixth segment for receiving objects of the page descriptor type, said descriptors having a preamble provided with a field for storing at least one of the characteristics: page size, acquisition resolution, coding type and page orientation.

* * * * *